United States Patent
Choi et al.

(10) Patent No.: US 6,639,698 B2
(45) Date of Patent: Oct. 28, 2003

(54) OPTICAL SCANNING UNIT WITH ROTATABLE HOLOGRAM DISC

(75) Inventors: Hwan-young Choi, Anyang (KR); Moon-gyu Lee, Suwon (KR); Sung-min Cho, Seoul (KR); Jae-Youn Eum, Suwon (KR); Jin-seung Choi, Suwon (KR); Young-il Kim, Yongin (KR); Jee-hong Min, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 16 days.

(21) Appl. No.: 09/957,033

(22) Filed: Sep. 21, 2001

(65) Prior Publication Data

US 2002/0039210 A1 Apr. 4, 2002

(30) Foreign Application Priority Data

Sep. 29, 2000 (KR) .................................. 2000-57513

(51) Int. Cl.[7] .................................................. G02B 5/32
(52) U.S. Cl. ............................ 359/18; 359/15; 359/17; 359/209; 235/462.34
(58) Field of Search ............................... 359/18, 17, 15, 359/209; 235/462.34, 457

(56) References Cited

U.S. PATENT DOCUMENTS

| | | | | |
|---|---|---|---|---|
| 4,678,263 A | * | 7/1987 | Funato | 359/18 |
| 5,309,272 A | * | 5/1994 | Harris | 359/196 |
| 6,046,831 A | * | 4/2000 | Eum | 359/18 |

* cited by examiner

Primary Examiner—John Juba
Assistant Examiner—Leo Boutsikaris
(74) Attorney, Agent, or Firm—Staas & Halsey LLP

(57) ABSTRACT

An optical scanning unit with a rotatable hologram disc, including a light source, a rotatable hologram disc provided with a plurality of holograms, the holograms being formed concentrically along a radial direction to diffract a beam emitted from the light source by multiple steps, a reflecting member that reflects the beam emitted from the light source and diffracted by one of the holograms into another hologram, and a fixed hologram correcting the diffracted beam incident through the rotatable hologram disc to focus it on a scanning object. In the optical scanning unit, the light passes through the plurality of holograms formed along a radial direction of the rotatable hologram disc so that a scan width can be extended without reducing a scan speed of the optical scanning unit.

57 Claims, 4 Drawing Sheets

OPTICAL SCANNING UNIT WITH ROTATABLE HOLOGRAM DISC

CROSS-REFERENCE TO RELATED APPLICATIONS

This application claims the benefit of Korean Application No. 2000-57513, filed on Sep. 29, 2000, in the Korean Industrial Property Office, the disclosure of which is incorporated herein by reference.

BACKGROUND OF THE INVENTION

1. Field of the Invention

The present invention relates to an optical scanning unit, and more particularly, to an optical scanning unit with a rotatable hologram disc having a plurality of concentric holograms formed in a radial direction.

2. Description of the Related Art

Generally, in electrophotographic image forming devices, an optical scanning unit is provided to scan a light beam to a photoreceptive medium to form an electrostatic latent image.

Conventionally, optical scanning units include a light source, a rotary polygonal mirror, and an f-θ lens.

Figure 1:
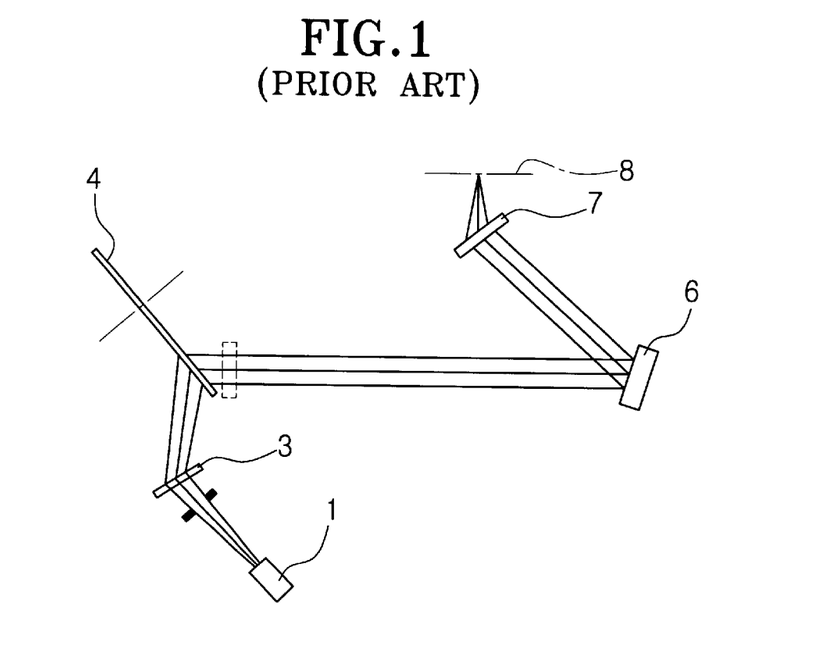
FIG. 1 shows a conventional optical scanning unit.

However, more recently it has been suggested that the optical scanning unit could alternatively be implemented with a rotatable hologram disc, for diffractively deflecting a beam emitted from a light source, with its schematic configuration being shown in FIG. 1.

Referring to FIG. 1, the optical scanning unit includes an in-scan corrector hologram 3, a rotatable hologram disc 4, a curved mirror 6, and a cross corrector hologram 7 on a path of a beam emitted from a light source 1.

The beam emitted from the light source 1 is focused, by the in-scan corrector hologram 3, to fall on the rotatable hologram disc 4. The beam incident on the rotatable hologram disc 4 is thereby diffracted, with its bow and aberration being eliminated by the curved mirror 6 and the cross corrector hologram 7. The beam is then scanned to a photoreceptive medium 8.

Figure 2:
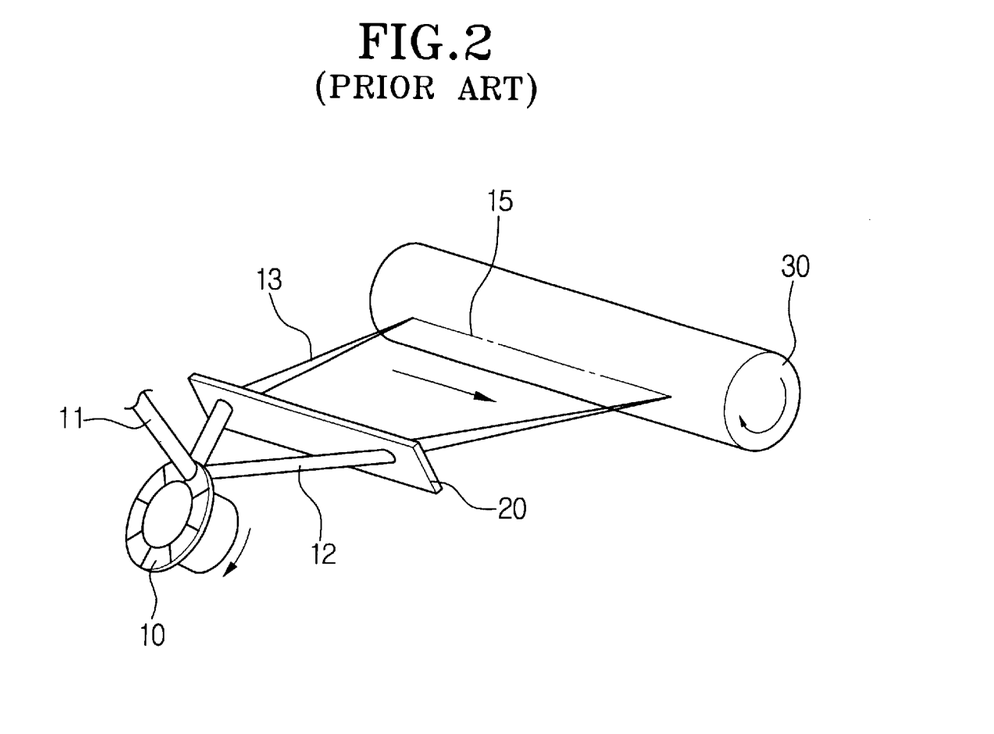
FIG. 2 shows another conventional optical scanning unit.

Another example of an optical scanning unit is shown in FIG. 2. As illustrated in FIG. 2, the optical scanning unit includes a rotatable hologram disc 10 and a fixed hologram 20. A beam 11 emitted from a light source (not shown) is diffracted by the rotatable hologram disc 10 to generate a diffractive beam 12. The diffractive beam 12 is diffracted again by the fixed hologram 20 to generate a diffractive beam 13. The diffractive beam 13 is scanned to an image formation region 15.

In the aforementioned optical scanning units using rotatable hologram discs, the sector size of the disc and the number of sectors are based upon the scan width.

Likewise, in the optical scanning unit using a rotatable polygonal mirror, the mirror size of the rotatable polygonal mirror and the number of its surfaces are also based upon the scan width.

Typically, the optical scanning units have been designed to scan across A4 sized paper (210×297 mm). However, due to recent demands of the market, it is desirable to have an optical scanning unit for A3 sized paper (297×420 mm).

Figure 3:
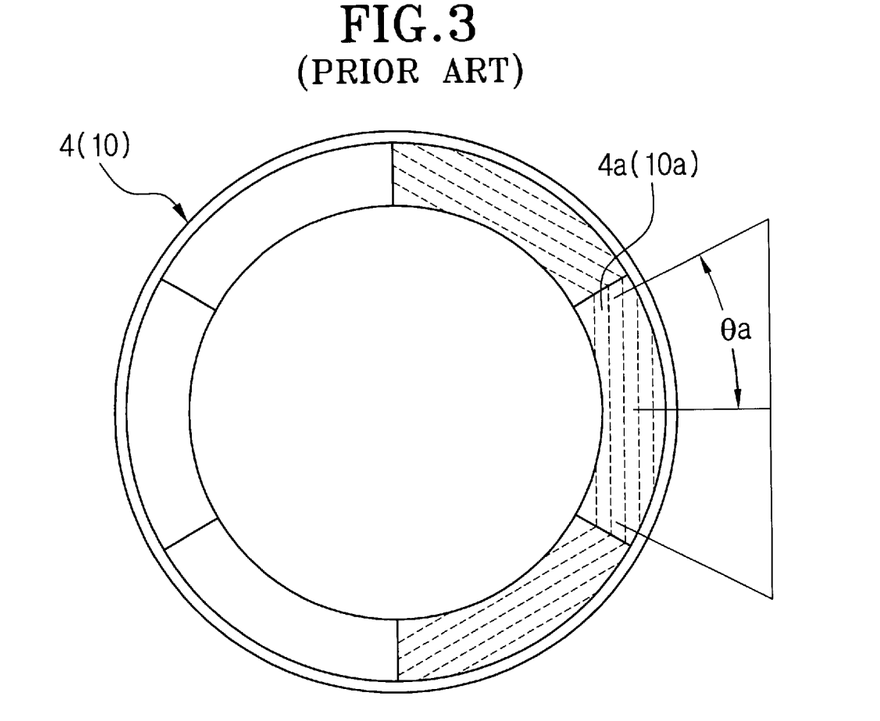
FIG. 3 shows a conventional rotatable hologram disc and a scan angle for a sector thereof.

However, to provide the scan width corresponding to the A3 sized paper, the optical scanning unit requires a hologram disc having an increased sector size. That is, as shown in FIG. 3, if one sector 4a or 10a, corresponding to respective discs 4 and 10 of FIGS. 1 and 2, provides a scan angle of θa, an increased sector size is required to extend the scan angle. However, if the sector size is increased, a problem arises in that the number of sectors is reduced, thereby reducing a scan speed. Further, even in the case of a rotatable polygonal mirror (not shown), if the mirror size is increased, the scan speed is reduced. Thus, the scan width cannot be extended while uniformly maintaining the scan speed.

Furthermore, to increase the scan speed, it has been suggested to increase the rotation speed of a motor rotating the rotatable polygonal mirror or the discs 4 and 10, of respective FIGS. 1 and 2. However, with this solution, there exists a technical limitation in increasing the rotation speed of the motor. Moreover, a high speed rotatable motor provided with a high speed fluid/gas bearing is expensive.

SUMMARY OF THE INVENTION

Accordingly, it is a primary object of the present invention to provide an optical scanning unit with a rotatable hologram disc in which a scan width can be extended without reducing a scan speed.

Additional objects and advantages of the invention will be set forth in part in the description which follows and, in part, will be obvious from the description, or may be learned by practice of the invention.

In order to achieve the above and other objects of the present invention, there is provided an optical scanning unit with a rotatable hologram disc in accordance with the present invention including a light source, a rotatable hologram disc provided with a plurality of holograms, the holograms being formed concentrically along a radial direction to diffract a beam emitted from the light source, a reflecting member that reflects the beam emitted from the light source and diffracted by one of the holograms into another hologram, and a fixed hologram correcting the diffracted beam incident through the rotatable hologram disc to focus it on a scanning object.

Preferably, the rotatable hologram disc includes an inner hologram and an outer hologram which are sequentially formed along a radial direction from the center.

In accordance with one aspect of the present invention, the inner hologram is a transmittance type that transmits and diffracts the beam emitted from the light source while the outer hologram is a reflecting type that reflects and diffracts the beam incident from the inner hologram as reflected by the reflecting member.

In accordance with another aspect of the present invention, the inner hologram and the outer hologram respectively are of a transmittance type to transmit and diffract an incident beam. Also, the optical scanning unit in accordance with another aspect of the present invention further includes a reflecting member reflecting the beam transmitted by the outer hologram into the fixed hologram.

In accordance with still another aspect of the present invention, the inner hologram and the outer hologram, respectively, are of a transmittance type to transmit and diffract the incident beam. Also, the optical scanning unit in accordance with still another aspect of the present invention further includes a reflecting layer formed on a surface of the rotatable hologram disc that is opposite to another surface of the rotatable hologram disc where the outer hologram is formed, to reflect the beam, which is transmitted through the outer hologram, back through the outer hologram.

Further, the inner hologram and the outer hologram may have the same diffractive pattern or different diffractive patterns.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

An optical scanning unit with a rotatable hologram disc in accordance with preferred embodiments of the present invention will now be described in detail with reference to the accompanying drawings.

Figure 4:
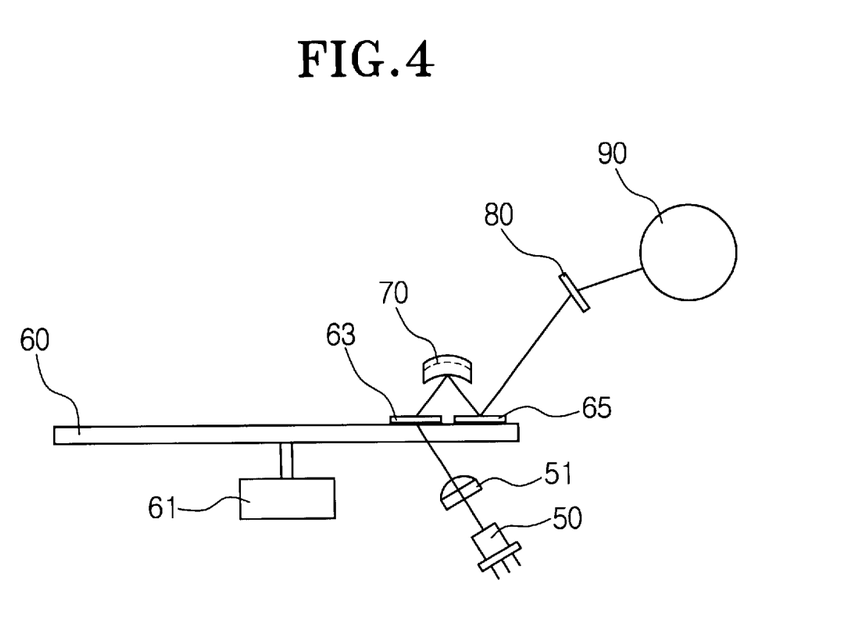
FIG. 4 shows an optical scanning unit according to a first embodiment of the present invention.

FIG. 4 shows an optical scanning unit according to a first embodiment of the present invention. As illustrated in FIG. 4, an optical scanning unit includes a light source 50, a rotatable hologram disc 60, a curved reflecting mirror 70, and a fixed hologram 80. A laser diode is preferably used as the light source 50. A collimator lens 51 converts a beam emitted from the light source 50 to a parallel beam so that the parallel beam is incident on the rotatable hologram disc 60.

The rotatable hologram disc 60 is rotated by a motor 61 that serves as a driving source.

The rotatable hologram disc 60 includes a plurality of holograms concentrically separated along a radial direction in a round ring shape from the rotation center to diffract an incident beam. Preferably, the number of the holograms formed in the radial direction is at least two or more.

Figure 5:
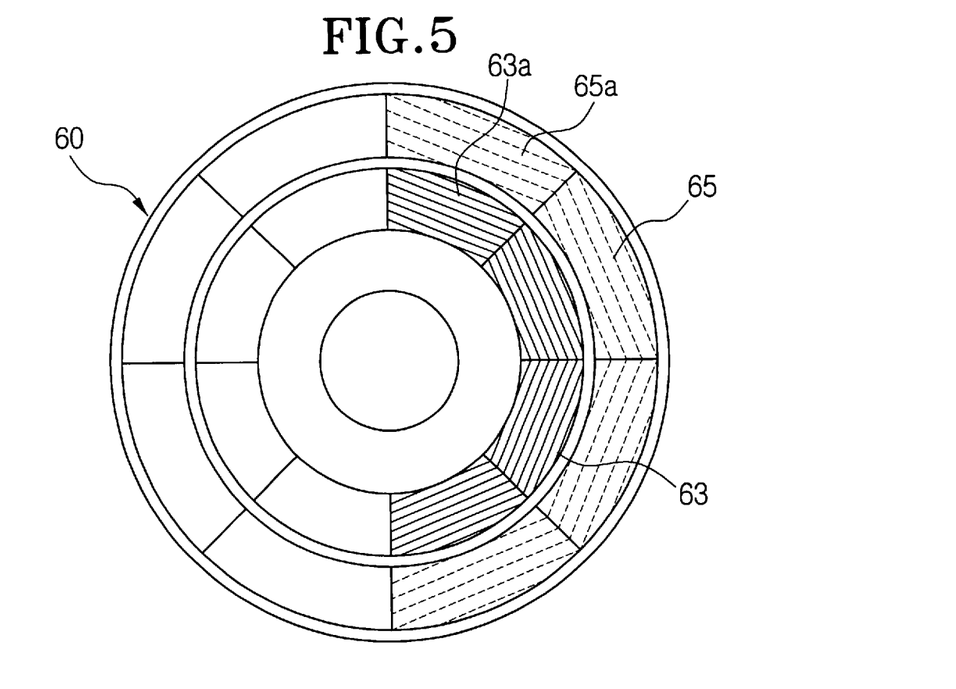
FIG. 5 shows a plane view of the rotatable hologram disc of FIG. 4.

The rotatable hologram disc 60 of FIG. 4 will now be described with reference to FIG. 5. As illustrated in FIG. 5, the rotatable hologram disc 60 includes an inner hologram 63 and an outer hologram 65. The inner hologram 63 and the outer hologram 65 are sequentially formed in a radial direction from the center of the disc. Also, considering performance of the beam emitted from the light source 50 and the optical characteristics of the other elements located on a light path, the inner hologram 63 and the outer hologram 65 may be formed to have the same diffractive pattern or different diffractive patterns that serve to determine a diffractive angle of the incident beam along a circumferential direction.

In accordance with one aspect of the present invention, to shorten the light path and facilitate arrangement design of the optical system, the inner hologram 63 is of a transmission type while the outer hologram 65 is of a reflecting type. A transmission type hologram transmits the incident beam and serves to diffract the transmitted beam, while a reflecting type hologram reflects the incident beam and serves to diffract the reflected beam.

Figure 6:
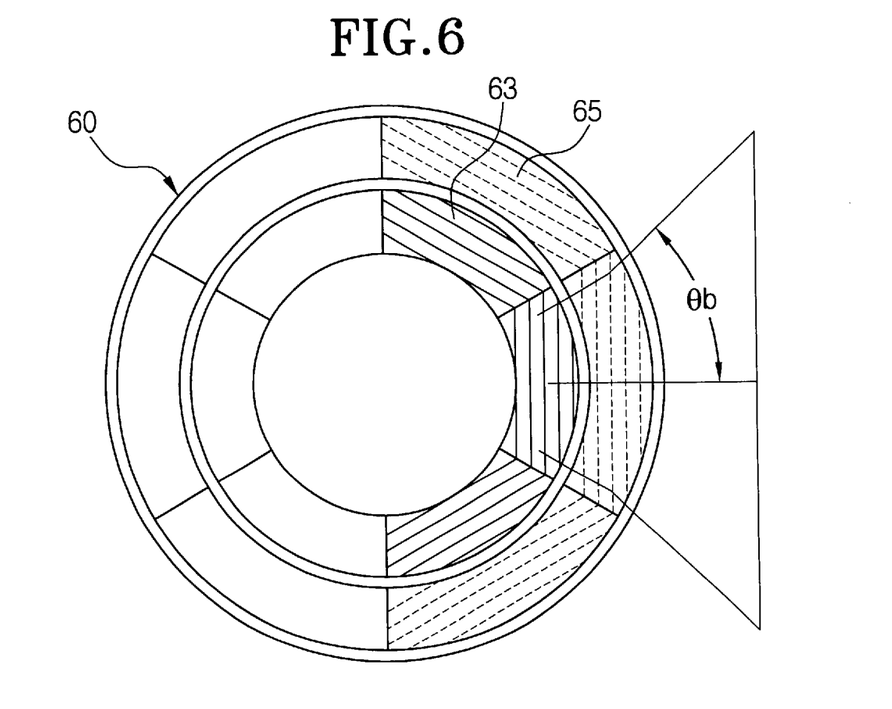
FIG. 6 shows the plane view of the rotatable hologram disc of FIG. 4 and a scan angle for a sector thereof.

Each of the holograms 63 and 65 includes a plurality of sectors corresponding to the scan width, each sector having a diffractive pattern to gradually increase a diffractive angle along the circumferential direction against the incident beam. Individual sectors 63a and 65a, corresponding respectively to holograms 63 and 65, are formed to correspond to each other along the same azimuth angle in the radial direction and are paired with each other to generate a predetermined scan width. That is, as shown in FIG. 6, the scan angle θb provided by sectors of the rotatable hologram disc 60 is gradually extended by passing from the inner hologram to outer hologram. Accordingly, the optical scanning unit of the present embodiment has a greater scan width in proportion to a number of diffraction steps than the scan width of a conventional optical scanning unit. Also, the scan width can be extended without reducing the scan speed.

Moreover, if the scan width is maintained in the same manner as in conventional optical scanning units, the number of the hologram sectors of the rotatable hologram disc 60 can be increased, whereby the scan speed of a scanning unit can be also increased.

In addition, the inner hologram 63 and/or the outer hologram 65 of the rotatable hologram disc 60 of the above embodiment of the present invention may also serve to correct for aberrations. In such case, other optical parts of the optical system, for example the fixed hologram 80, may be fabricated to have a bow correction function only.

The curved reflecting mirror 70 serves as a reflecting member. By using the curved reflecting mirror 70, a primary diffractive beam, which is generated while passed through the inner hologram 63 of the rotatable hologram disc 60, is reflected to the outer hologram 65. The curved reflecting mirror 70 also serves to guide the primary diffractive beam to be incident on the outer hologram 65 at a constant angle.

Alternatively, the curved reflecting mirror 70 may be replaced by a spherical reflecting mirror or a plane reflecting mirror depending on design of the optical system.

The fixed hologram 80 corrects aberration and bow of a secondary diffractive beam diffracted from the outer hologram 65 so that the secondary diffractive beam is focused on a photoreceptive medium 90. A correction hologram pattern of the fixed hologram 80 is formed on any one of a light incident surface and/or a light-emitting surface thereof.

The operation of the aforementioned optical scanning unit will now be described.

The beam emitted from the light source 50 is collected into a parallel beam as the beam is passed through the collimator lens 51. Such a parallel beam is incident on the inner hologram 63 of the rotatable hologram disc 60. The beam incident on the inner hologram 63 is diffracted into a primary diffractive beam as it is passed through and exits the inner hologram 63.

The primary diffractive beam is reflected by the curved reflecting mirror 70 to be incident on the outer hologram 65. The outer hologram 65 thereafter reflects and diffracts the primary diffractive beam into a secondary diffractive beam.

Bow and aberration of the secondary diffractive beam reflected by the outer hologram 65 are eliminated by the fixed hologram 80 to form a focus point on the photoreceptive medium 90. The aforementioned "bow" of a light beam refers to the beam being curved in a bow shape.

Figure 7:
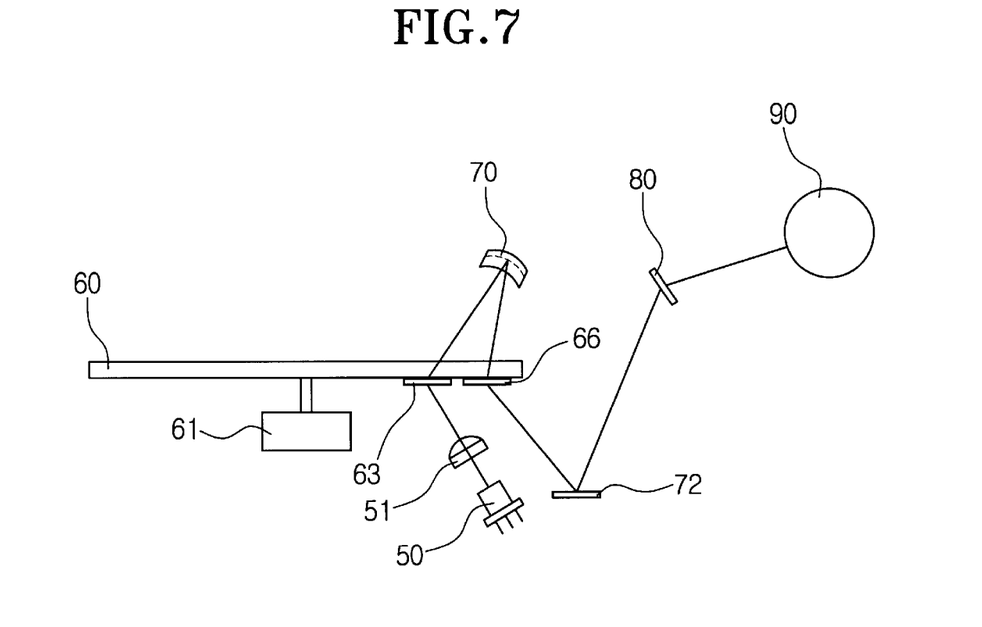
FIG. 7 shows an optical system of an optical scanning unit according to a second embodiment of the present invention.

FIG. 7 shows an optical scanning unit according to a second embodiment of the present invention, with like reference elements in the optical scanning unit according to the second embodiment of the present invention corresponding to the same reference elements as those of the first embodiment, illustrated in FIG. 4.

Referring to FIG. 7, the optical scanning unit includes a rotatable hologram disc 60 provided with transmittance type inner and outer holograms, and a reflecting member 72 for converting a path of a secondary diffractive beam which passed through the outer hologram to collect the beam on a fixed hologram. As opposed to the first embodiment, the outer hologram 66 of the second embodiment is of a transmittance type rather than of a reflective type, and is position on the same surface of the hologram disk 60 as the inner hologram 63, which faces the light source 50.

In the operation of the optical scanning unit according to the second embodiment of the present invention, a beam emitted from the light source 50 is passed through the collimator lens 51 and the inner hologram 63 of the rotatable hologram disc 60 into a primary diffractive beam. The primary diffractive beam is reflected by the curved reflecting mirror 70 and then passed through the outer hologram 66 to form a secondary diffractive beam. The secondary diffractive beam is reflected by the reflecting member 72 and then reaches an image surface of a photoreceptive medium 90 through the fixed hologram 80.

Figure 8:
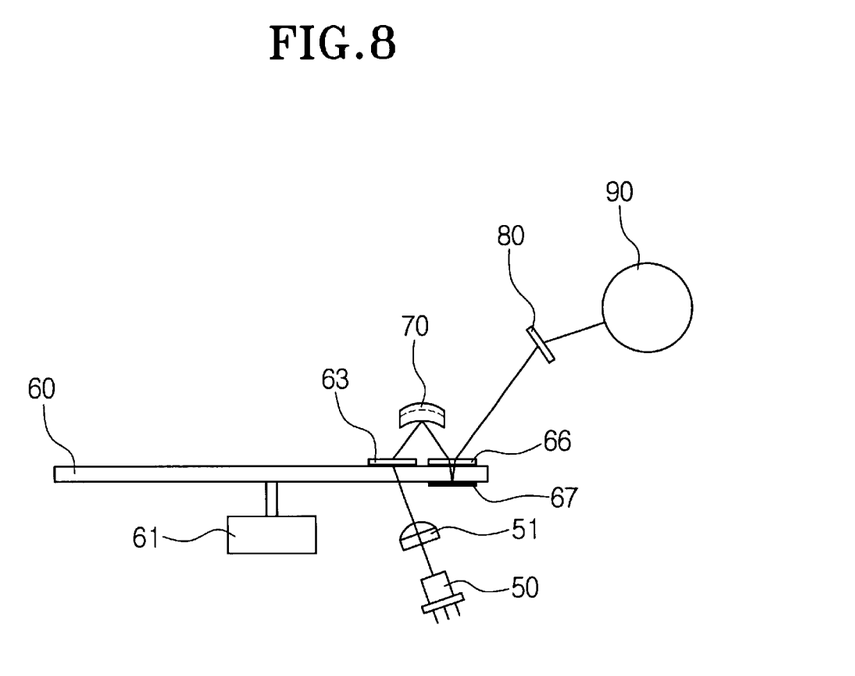
FIG. 8 shows an optical system of an optical scanning unit according to a third embodiment of the present invention.

FIG. 8 shows an optical scanning unit according to the third embodiment of the present invention, with like reference elements in the optical scanning unit according to the third embodiment of the present invention corresponding to the same reference elements as those of the first and second embodiments, respectively illustrated in FIGS. 4 and 7.

Referring to FIG. 8, the optical scanning unit includes a rotatable hologram disc 60 and a reflecting layer 67 opposite to a transmittance type outer hologram 66.

If the reflecting layer 67 is formed on the rotatable hologram disc 60, a light path can be shortened and a diffractive angle can be extended as compared with the optical scanning unit of FIG. 7. However, it is not necessary for the reflecting layer 67 to be formed on the rotatable hologram disc 60. In this instance, the inner hologram 63 and the outer hologram 66 are both formed on the same surface of the hologram disk 60 on a side opposite to that facing the light source 50.

In the operation of the optical scanning unit according to the third embodiment of the present invention, a beam emitted from the light source 50 is incident on the outer hologram 66 by way of the inner hologram 63 and the curved reflecting mirror 70. A primary diffractive beam emitted by the inner hologram 63, and which is incident on the outer hologram 66, is first diffracted as it is passed through the outer hologram 66. After the diffracted beam is reflected by the reflecting layer 67, attached to the rotatable hologram disc 60, the diffracted beam is again diffracted as it is again passed through the outer hologram 66. The beam thereafter reaches the photoreceptive medium 90 through the fixed hologram 80.

Both the inner hologram and the outer hologram may also be of a reflecting type. Alternatively, the inner hologram may be of a reflecting type while the outer hologram may be of a transmittance type.

As described above, the optical scanning unit according to embodiments of the present invention is advantageous over conventional scanning units. Specifically, since the light beam passes through a plurality of the holograms formed along a radial direction of the rotatable hologram disc, the scan width can be extended without reducing the scan speed.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. An optical scanning unit, comprising:
   a light source to emit a beam;
   a rotatable hologram disc provided with a plurality of holograms, the holograms being formed concentrically along a radial direction to diffract the beam emitted from the light source;
   a reflecting member to reflect the beam emitted from the light source and diffracted by a transmittance type one of the plurality of holograms into another reflective type one of the plurality of holograms;
   a scanning object; and
   a fixed hologram to correct the beam diffracted by the rotatable hologram disc and to focus the corrected beam on the scanning object.

2. The optical scanning unit of claim 1, further comprising a collimator lens to convert the beam emitted from the light source into a parallel beam incident on the one hologram.

3. The optical scanning unit of claim 1, wherein the one hologram corresponds to an inner hologram and the other one hologram corresponds to an outer hologram, with the inner and outer holograms being sequentially formed along a radial direction from a center of the rotatable hologram disc.

4. The optical scanning unit of claim 3, wherein the inner hologram and the outer hologram have different diffractive patterns.

5. The optical scanning unit of claim 3, wherein the inner hologram and the outer hologram have the same diffractive pattern.

6. The optical scanning unit of claim 1, wherein the reflecting member is a curved reflecting mirror.

7. The optical scanning unit of claim 1, wherein the reflecting member is a spherical reflecting mirror.

8. The optical scanning unit of claim 1, wherein the reflecting member is a plane reflecting mirror.

9. The optical scanning unit of claim 1, wherein the fixed hologram includes a hologram formed on any one of a light-incident surface and a light-emitting surface thereof.

10. The optical scanning unit of claim 1, wherein the fixed hologram includes holograms respectively formed on both a light-incident surface and a light-emitting surface thereof.

11. The optical scanning unit of claim 1, wherein the fixed hologram corrects for aberrations and/or bow shaping generated in the optical scanning unit.

12. The optical scanning unit of claim 1, wherein the fixed hologram corrects for bow shaping generated in the optical scanning unit, and not for aberrations generated in the optical scanning unit.

13. An optical scanning unit, comprising:
   a light source to emit a beam;
   a rotatable hologram disc provided with a plurality of holograms, the holograms being formed concentrically along a radial direction to diffract the beam emitted from the light source;
   a reflecting member to reflect the beam emitted from the light source and diffracted by one of the plurality of holograms into another one of the plurality of holograms;
   a scanning object; and a fixed hologram to correct the beam diffracted by the rotatable hologram disc and to focus the corrected beam on the scanning object, wherein the one hologram corresponds to an inner hologram and the other one hologram corresponds to an outer hologram, with the inner and outer holograms being sequentially formed along a radial direction from a center of the rotatable hologram disc, and wherein the inner hologram is of a transmittance type that transmits and diffracts the beam emitted from the light source and the outer hologram is of a reflecting type that reflects and diffracts the beam from the reflecting member reflecting the beam diffracted by the inner hologram.

14. An optical scanning method for scanning a beam of light across an object, comprising:

emitting a light beam at a first transmittance type hologram on a rotatable hologram disc;

diffracting the emitted light beam using the first holy ram;

on the rotatable hologram disc being concentrically formed along a radial direction of the first hologram;

diffracting the transmitted light beam using the second hologram; and transmitting the second hologram diffracted light beam to the object.

15. The optical scanning method of claim 14, further comprising correcting the second hologram diffracted light beam for aberrations and bow shaping.

16. The optical scanning method of claim 14, wherein a scan angle generated by the diffracting performed by the first and second holograms is greater than a scan angle generated by either of the first or second holograms alone.

17. The optical scanning method of claim 14, wherein the transmitting of the first hologram diffracted light beam includes reflecting the first hologram diffracted light beam off of a reflecting member.

18. The optical scanning method of claim 14, wherein the transmitting of the second hologram diffracted light beam includes a reflecting operation performed on the second hologram diffracted light beam by the second hologram.

19. An optical scanning method for scanning a beam of light across an object, comprising:

emitting a light beam at a first hologram on a rotatable hologram disc;

diffracting the emitted light beam using the first hologram;

transmitting the first hologram diffracted light beam to a second hologram on the rotatable hologram disc being concentrically formed along a radial direction of the first hologram;

diffracting the transmitted light beam using the second hologram; and transmitting the second hologram diffracted light beam to the object, wherein the transmitting of the second hologram diffracted light beam includes a reflecting operation performed on the second hologram diffracted light beam by a reflecting member formed on a surface of the rotatable hologram disc that is opposite to another surface of the rotatable hologram disc where the second hologram is formed.

20. An optical scanning unit, comprising:

a light source to transmit a light beam on a hologram disc;

the hologram disc including first and second holograms sequentially formed along a radial direction from a center of the hologram disc; and a reflecting member, separate from the hologram disc, to reflect a light beam exiting the first hologram to the second hologram.

21. The optical scanning unit of claim 20, wherein a scan angle generated by a diffraction performed by the first and second holograms is greater than a scan angle generated by either of the first or second holograms alone.

22. The optical scanning unit of claim 20, wherein at least one of the first and second holograms correct for aberrations and/or bow shaping.

23. The optical scanning unit of claim 20, wherein first and second holograms are formed on a upper surface of the hologram disc.

24. The optical scanning unit of claim 20, wherein first and second holograms are formed on a lower surface of the hologram disc.

25. A hologram disc, comprising:

a first hologram to generate a first predetermined scan angle; and a second hologram, sequentially formed after the first hologram along a radial direction from a center of the hologram disc, with the second hologram having a second predetermined scan angle such that a scan angle generated by a diffraction performed by the first and second holograms is greater than either of the first or second predetermined scan angles, wherein the first hologram is of a reflecting type and the second hologram is of a transmittance type.

26. The hologram disc of claim 25, wherein the first and second holograms are both formed on an upper surface of the hologram disc.

27. The hologram disc of claim 25, wherein the first and second holograms are both formed on a lower surface of the hologram disc.

28. A hologram disc, comprising:

a first hologram to generate a first predetermined scan angle; and a second hologram, sequentially formed after the first hologram along a radial direction from a center of the hologram disc, with the second hologram having a second predetermined scan angle such that a scan angle generated by a diffraction performed by the first and second holograms is greater than either of the first or second predetermined scan angles, wherein the first hologram is of a transmittance type and the second hologram is of a reflecting type.

29. The hologram disc of claim 28, wherein the first and second holograms are both formed on an upper surface of the hologram disc.

30. The hologram disc of claim 28, wherein the first and second holograms are both formed on a lower surface of the hologram disc.

31. A hologram disc, comprising:

a first hologram to generate a first predetermined scan angle; and a second hologram, sequentially formed after the first hologram along a radial direction from a center of the hologram disc, with the second hologram having a second predetermined scan angle such that a scan angle generated by a diffraction performed by the first and second holograms is greater than either of the first or second predetermined scan angles, wherein the first and second holograms are both of a reflecting type.

32. The hologram disc of claim 31, wherein the first and second holograms are both formed on an upper surface of the hologram disc.

33. The hologram disc of claim 31, wherein the first and second holograms are both formed on a lower surface of the hologram disc.

34. An optical scanning unit, comprising:
light source to emit a beam;
a rotatable hologram disc provided with a plurality of holograms, the holograms being formed concentrically along a radial direction to diffract the beam emitted from the light source;
a reflecting member to reflect the beam emitted from the light source and diffracted by a reflective type one of the plurality of holograms into another transmittance type one of the plurality of holograms;
a scanning object; and
a fixed hologram to correct the beam diffracted by the rotatable hologram disc and to focus the corrected beam on the scanning object.

35. The optical scanning unit of claim 34, further comprising a collimator lens to convert the beam emitted from the light source into a parallel beam incident on the one hologram.

36. The optical scanning unit of claim 34, wherein the one hologram corresponds to an inner hologram and the other one hologram corresponds to an outer hologram, with the inner and outer holograms being sequentially formed along a radial direction from a center of the rotatable hologram disc.

37. The optical scanning unit of claim 36, wherein the inner hologram and the outer hologram have different diffractive patterns.

38. The optical scanning unit of claim 36, wherein the inner hologram and the outer hologram have the same diffractive pattern.

39. The optical scanning unit of claim 34, wherein the reflecting member is a curved reflecting mirror.

40. The optical scanning unit of claim 34, wherein the reflecting member is a spherical reflecting mirror.

41. The optical scanning unit of claim 34, wherein the reflecting member is a plane reflecting mirror.

42. The optical scanning unit of claim 34, wherein the fixed hologram includes a hologram formed on any one of a light-incident surface and a light-emitting surface thereof.

43. The optical scanning unit of claim 34, wherein the fixed hologram includes holograms respectively formed on both a light-incident surface and a light-emitting surface thereof.

44. The optical scanning unit of claim 34, wherein the fixed hologram corrects for aberrations and/or bow shaping generated in the optical scanning unit.

45. The optical scanning unit of claim 34, wherein the fixed hologram corrects for bow shaping generated in the optical scanning unit, and not for aberrations generated in the optical scanning unit.

46. An optical scanning method for scanning a beam of light across an object, comprising:
emitting a light beam at a first reflective type hologram on a rotatable hologram disc;
diffracting the emitted light beam using the first hologram;
transmitting the first hologram diffracted light beam to a second transmittance type hologram on the rotatable hologram disc being concentrically formed along a radial direction of the first hologram;
diffracting the transmitted light beam using the second hologram; and
transmitting the second hologram diffracted light beam to the object.

47. The optical scanning method of claim 46, further comprising correcting the second hologram diffracted light beam for aberrations and bow shaping.

48. The optical scanning method of claim 46, wherein a scan angle generated by the diffracting performed by the first and second holograms is greater than a scan angle generated by either of the first or second holograms alone.

49. The optical scanning method of claim 46, wherein the transmitting of the first hologram diffracted light beam includes reflecting the first hologram diffracted light beam off of a reflecting member.

50. The optical scanning method of claim 46, wherein the transmitting of the second hologram diffracted light beam includes a reflecting operation performed on the second hologram diffracted light beam by the second hologram.

51. An optical scanning method for scanning a beam of light across an object, comprising:
emitting a light beam at a first reflective type hologram on a rotatable hologram disc;
diffracting the emitted light beam using the first hologram;
transmitting the first hologram diffracted light beam to a second reflective type hologram on the rotatable hologram disc being concentrically formed along a radial direction of the first hologram;
diffracting the transmitted light beam using the second hologram; and
transmitting the second hologram diffracted light beam to the object.

52. The optical scanning method of claim 51, further comprising correcting the second hologram diffracted light beam for aberrations and bow shaping.

53. The optical scanning method of claim 51, wherein a scan angle generated by the diffracting performed by the first and second holograms is greater than a scan angle generated by either of the first or second holograms alone.

54. The optical scanning method of claim 51, wherein the transmitting of the first hologram diffracted light beam includes reflecting the first hologram diffracted light beam off of a reflecting member.

55. The optical scanning method of claim 51, wherein the transmitting of the second hologram diffracted light beam includes a reflecting operation performed on the second hologram diffracted light beam by the second hologram.

56. An optical scanning unit, comprising:
a light source to emit a beam;
a rotatable hologram disc provided with a plurality of holograms, the holograms being formed concentrically along a radial direction to diffract the beam emitted from the light source;
a reflecting member, separate from the hologram disc, to reflect the beam emitted from the light source and diffracted by one of the plurality of holograms into another one of the plurality of holograms;
a scanning object; and
a fixed hologram to correct the beam diffracted by the rotatable hologram disc and to focus the corrected beam on the scanning object.

57. An optical scanning method for scanning a beam of light across an object, comprising:

emitting a light beam at a first hologram on a rotatable hologram disc;

diffracting the emitted light beam using the first hologram;

reflecting the first hologram diffracted light beam, using a reflector separate from the rotatable hologram disc, to a second hologram on the rotatable hologram disc being concentrically formed along a radial direction of the first hologram;

diffracting the transmitted light beam using the second hologram; and transmitting the second hologram diffracted light beam to the object.

* * * * *